United States Patent
Wu et al.

(10) Patent No.: US 7,988,806 B2
(45) Date of Patent: Aug. 2, 2011

(54) METHOD FOR MANUFACTURING A RUBBER MAGNET WITH A COLORED FACIAL GUM MATERIAL LAYER AND A RUBBER MAGNET THEREOF

(76) Inventors: Hung-Chih Wu, Hsin-Chuang (TW); Chen-Liang Fan Chiang, Hsin-Chuang (TW)

( * ) Notice: Subject to any disclaimer, the term of this patent is extended or adjusted under 35 U.S.C. 154(b) by 829 days.

(21) Appl. No.: 11/492,990

(22) Filed: Jul. 26, 2006

(65) Prior Publication Data
US 2008/0032042 A1 Feb. 7, 2008

(51) Int. Cl.
*B05D 5/10* (2006.01)
(52) U.S. Cl. .................................... 156/272.2
(58) Field of Classification Search .............. 427/487, 427/508, 514, 207.1, 127; 156/272.2, 272.4
See application file for complete search history.

(56) References Cited

U.S. PATENT DOCUMENTS

| | | | | |
|---|---|---|---|---|
| 3,919,719 A | * | 11/1975 | Wright et al. | 360/134 |
| 5,446,083 A | * | 8/1995 | Stevens et al. | 524/458 |
| 2004/0092632 A1 | * | 5/2004 | Schultz et al. | 524/261 |

* cited by examiner

*Primary Examiner* — Richard Crispino
*Assistant Examiner* — Daniel McNally
(74) *Attorney, Agent, or Firm* — Rosenberg, Klein & Lee

(57) ABSTRACT

A method for manufacturing a rubber magnet with a colored facial gum material layer and a rubber magnet thereof. A colored gum material layer is paved on a surface of the rubber magnet. A surfactant is added into the colored gum material layer. An identical surfactant or a surfactant with very close polarity is added into the material of the rubber magnet, whereby the surfaces of the gum material layer and the rubber magnet can tightly adhere to each other without easy peeling. In addition, antiscaling agent, wetting/spreading agent and defoaming agent are added into the gum material layer to fully wet the color and uniformly spread the color over the gum material so as to enhance the evenness of the color.

12 Claims, 4 Drawing Sheets

METHOD FOR MANUFACTURING A RUBBER MAGNET WITH A COLORED FACIAL GUM MATERIAL LAYER AND A RUBBER MAGNET THEREOF

BACKGROUND OF THE INVENTION

The present invention is related to a method for manufacturing a rubber magnet with a colored facial gum material layer and a rubber magnet thereof. By means of the method, the surfaces of the colored gum material layer and the rubber magnet can tightly adhere to each other without easy peeling. Moreover, the evenness of the color of the facial gum material layer is enhanced.

A conventional rubber magnet is made from a mixture of a rubber/plastic complex material and ferric oxide powder added into the rubber/plastic complex material. The mixture is at least once magnetized to become flexible rubber magnet having magnetic poles for attracting iron-made articles.

In use of the conventional rubber magnet, it often takes place that the ferric oxide powder drops down to contaminate a user's hands. The magnetic powder is toxic so that in the case that the user incautiously eats it or some sensitive parts (such as the eyes) of the user contact the toxic powder, the user's health will be greatly affected.

In order to overcome this problem, as shown in FIGS. 1 and 2, a layer of polishing oil or a paint 61 is painted or halftone printed on the surface of the conventional rubber magnet 60 as an isolating layer. However, such gum material or paint material has a surface performance quite different from that of the magnet. Therefore, the paint layer at the folding section of the soft magnet tends to peel off or crack. This results in poor appearance of the magnet.

On the other hand, due to the composition of ferric oxide, the color of the surface of the rubber magnet is black brown. In order to change the color of the surface of the rubber magnet, in a typical manner, the surface is printed or painted with a paint. However, the ferric oxide particle structure is quite different from the paint particle structure. Therefore, the paint can hardly adhere to the rubber magnet. It often takes place the paint at the folding section of the soft magnet such as paper clip, decorative sheet and bookmark peels off or cracks. This results in poor appearance of the magnet and pollution of environment.

FIG. 3 shows that a facial colored layer 62 can be adhered to the surface of the rubber magnet 60 as an isolating layer. The facial layer 62 can be colored paper, PP composed paper, PVC facial layer or PET facial layer. However, such facial layer still tends to peel off in use of the rubber magnet.

SUMMARY OF THE INVENTION

It is therefore a primary object of the present invention to provide a method for manufacturing a rubber magnet with a colored facial gum material layer and a rubber magnet thereof. By means of the method, the surfaces of the colored gum material layer and the rubber magnet can be tightly bonded with each other without easy peeling.

According to the above object, the method for manufacturing a rubber magnet with a colored facial gum material layer of the present invention includes a step of paving a colored gum material layer on a surface of the rubber magnet. An anionic surfactant is added into the colored gum material layer. An identical surfactant or a surfactant with very close polarity is added into the material of the rubber magnet, whereby the surfaces of the gum material layer and the rubber magnet can tightly adhere to each other without easy peeling.

The present invention can be best understood through the following description and accompanying drawings wherein:

DETAILED DESCRIPTION OF THE PREFERRED EMBODIMENTS

Figure 1:
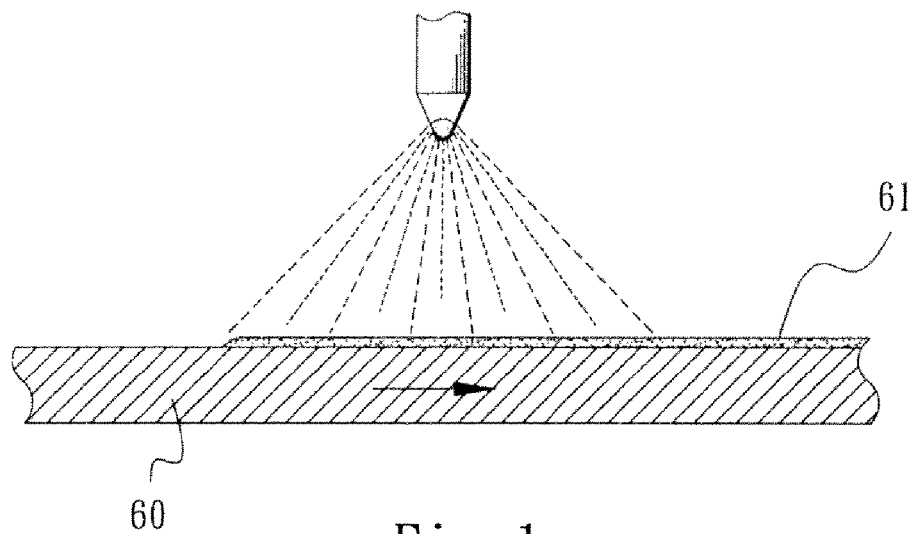
FIG. 1 is a sectional view showing that a layer of polishing oil or a paint is painted on the surface of the conventional rubber magnet as an isolating layer.
Figure 2:
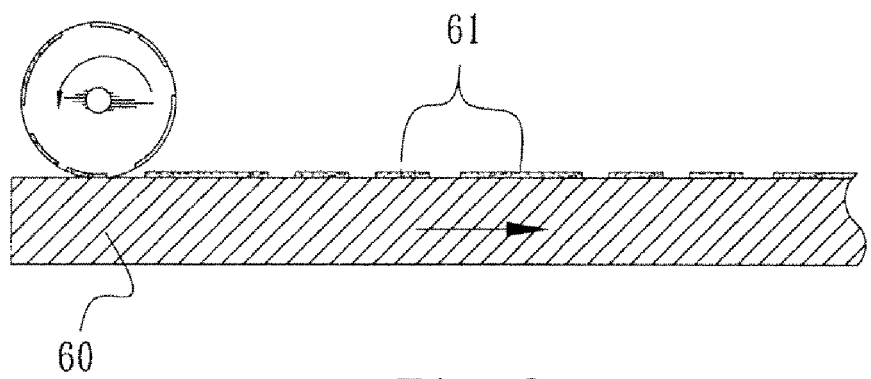
FIG. 2 is a sectional view showing that a layer of polishing oil or a paint is halftone printed on the surface of the conventional rubber magnet as an isolating layer.
Figure 3:
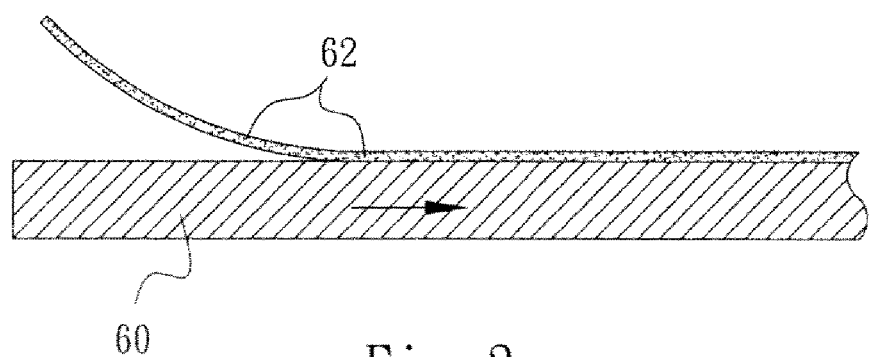
FIG. 3 is a sectional view showing that a facial colored layer is adhered to the surface of the rubber magnet as an isolating layer.
Figure 4:
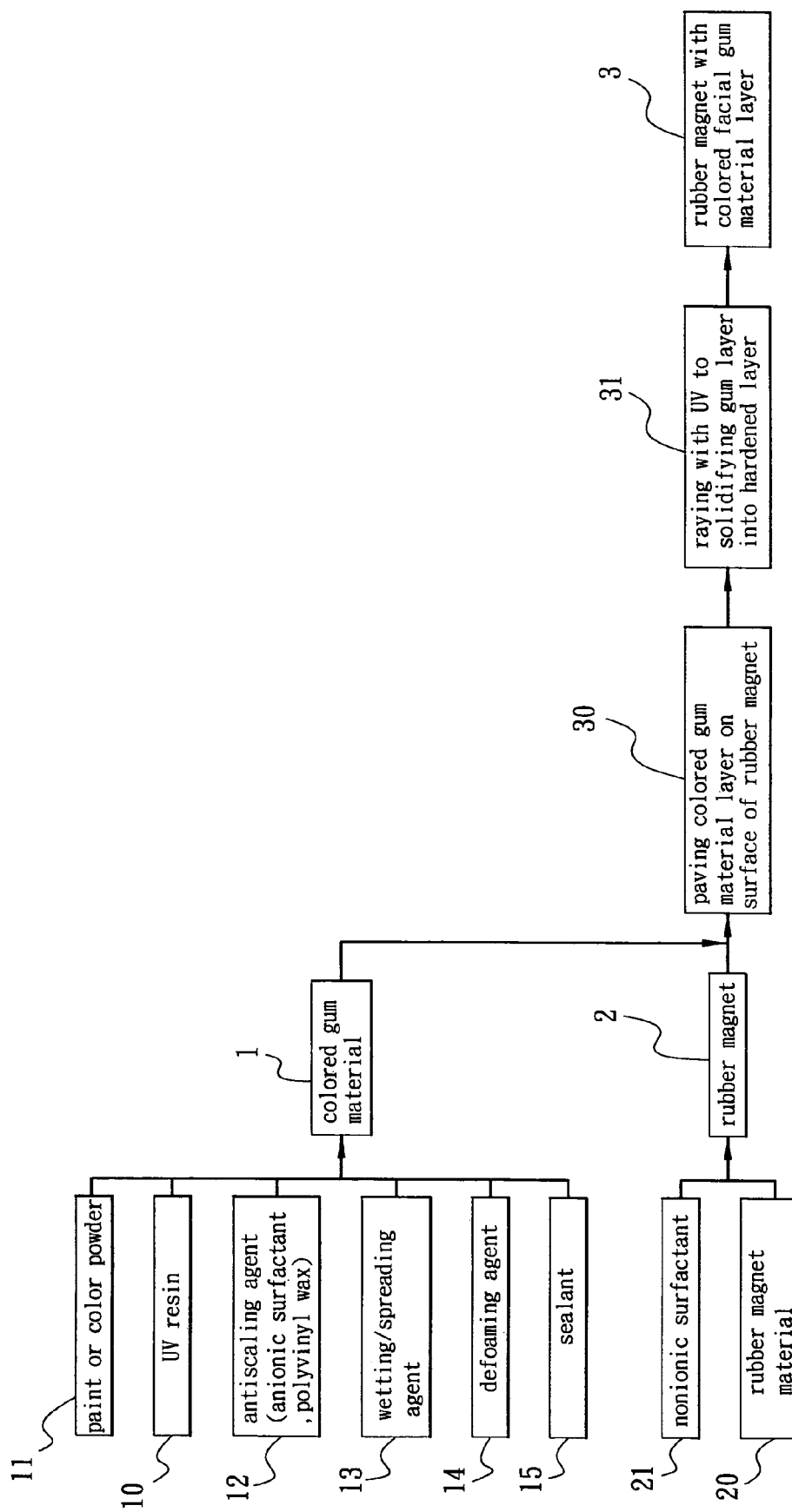
FIG. 4 is a flow chart of the manufacturing method of the present invention.
Figure 5:
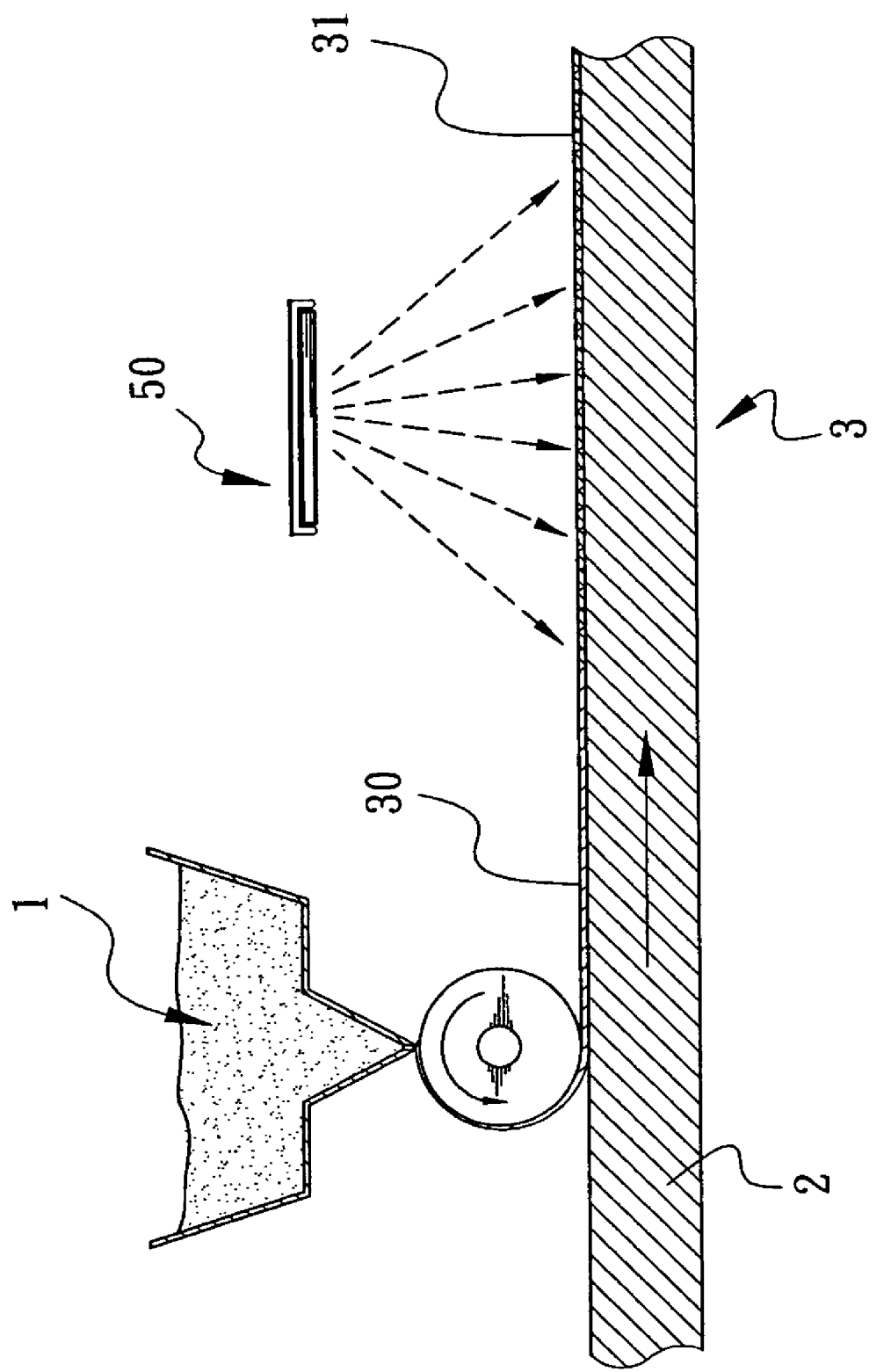
FIG. 5 is a sectional view showing that when producing the rubber magnet, the colored gum material layer is paved on the surface of the rubber magnet and rayed with ultraviolet ray.

Please refer to FIGS. 4 and 5. The colored rubber magnet of the present invention includes a substrate colored gum material 1 and a rubber magnet 2. The substrate colored gum material 1 is a mixture of a substrate gum material 10 (such as UV hardened resin) and some or all of the additives of paint or color powder 11, antiscaling agent 12, wetting/spreading agent 13, defoaming agent 14 and sealant 15. The antiscaling agent 12 can be polyvinyl wax or other anionic surfactant. The wetting/spreading agent 13 can be amine salt of polycarboxylic acid. The defoaming agent 14 can be non-silicone organic compound. The sealant 15 can be amino silane. The rubber magnet 2 is made from a rubber magnetic material 20. The rubber magnetic material 20 is a mixture of a rubber complex material and at least one of the magnetizable additives of barium, strontium, rubidium, cobalt, boron, iron, ferric oxide and compositions thereof. The rubber magnetic is then produced from the rubber magnetic material 20 with a machine. The present invention is characterized in that a nonionic surfactant 21 (such as polyethoxy ethanol) is added into the rubber magnetic material 20 in cooperation with the aforesaid anionic surfactant 12 to respective regulate the surfaces of the substrate colored gum material 1 and the rubber magnet 2 to have proximate performances. Then, when producing the rubber magnet, a substrate colored gum material layer 30 is paved on the surface of the rubber magnet by means of a tool such as a printing roller. Then, the rubber magnet with the colored gum material layer passes through a ultraviolet source 50 which rays ultraviolet ray onto the gum layer and fast solidifies the gum layer into a hardened facial layer 31 with uniform color. The hardened facial layer 31 and the rubber magnet 2 have close performances so that their surfaces can very tightly adhered to each other without peeling or cracking. The operation and solidification are speeded so that the color is highly unified to achieve excellent quality and beautiful appearance.

Figure 6A:
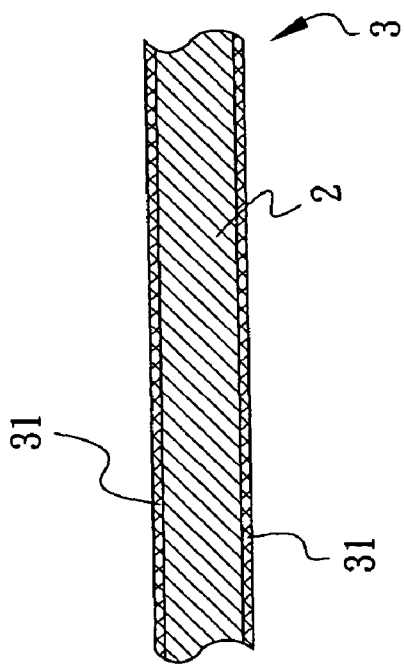
FIG. 6A is a sectional view showing a rubber magnet sheet with two hardened facial colored gum layers on both sides.
Figure 6:
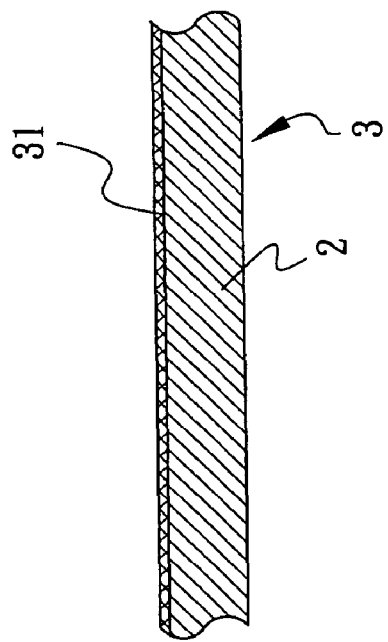
FIG. 6 is a sectional view showing a rubber magnet sheet with a hardened facial colored gum layer on single side.

FIG. 6 shows a rubber magnet 2 of the present invention with a hardened facial colored gum layer 31 on single side. However, as shown in FIG. 6A, two hardened facial colored gum layers 31 can be paved on both sides of the rubber magnet sheet 2 to achieve protective and decorative effects.

The above embodiments are only used to illustrate the present invention, not intended to limit the scope thereof. Many modifications of the above embodiments can be made without departing from the spirit of the present invention.

What is claimed is:

1. A method for manufacturing a rubber magnet with a colored facial gum material layer including the steps of:
   - forming a rubber magnet, said rubber magnet having a rubber composition and a first surfactant mixed therein:
   - forming a colored gum material layer, said gum material layer including a second surfactant and a sealant, said second surfactant being mixed within said gum material layer, said sealant being amino silane;
   - paving said gum material layer on a surface of the rubber magnet for adherence of said gum material layer to said rubber magnet wherein said second surfactant and said first surfactant respectively regulate the surfaces of the gum material layer and the rubber magnet to optimize adherence between the rubber magnet and the gum material layer, whereby the gum material layer and the rubber magnet can tightly adhere to each other;
   - forming a hardened facial layer with uniform color using ultraviolet rays to quickly dry and solidify said gum material layer into a hardened facial layer with uniform color without easy peeling.

2. The method as claimed in claim 1, wherein the rubber magnet is molded from a mixture of magnetizable materials, plastic/rubber complex material and said second surfactant is a nonionic surfactant.

3. The method as claimed in claim 2, wherein the nonionic surfactant is polyethoxy ethanol.

4. The method as claimed in claim 1, wherein the rubber magnet is molded from a mixture of magnetizable materials, plastic/rubber complex material and said first surfactant is a nonionic surfactant.

5. The method as claimed in claim 4, wherein the nonionic surfactant is polyethoxy ethanol.

6. The method as claimed in claim 1, wherein the colored gum material layer is a mixture of substrate UV hardened resin and an antiscaling agent.

7. The method as claimed in claim 6, wherein the antiscaling agent is an anionic surfactant or polyvinyl wax.

8. The method as claimed in claim 1, wherein the colored gum material layer is a mixture of substrate UV hardened resin and a wetting/spreading agent.

9. The method as claimed in claim 8, wherein the wetting/spreading agent is amine salt of polycarboxylic acid.

10. The method as claimed in claim 1, wherein the colored gum material layer is a mixture of substrate UV hardened resin and a defoaming agent.

11. The method as claimed in claim 10, wherein the defoaming agent is non-silicone organic compound.

12. The method as claimed in claim 1, wherein the colored gum material layer is a mixture of substrate UV hardened resin and additives of paint or color powder.

* * * * *